T. W. SUGGS.
PLANTER.
APPLICATION FILED APR. 14, 1913.
1,089,286.
Patented Mar. 3, 1914.
2 SHEETS—SHEET 1.
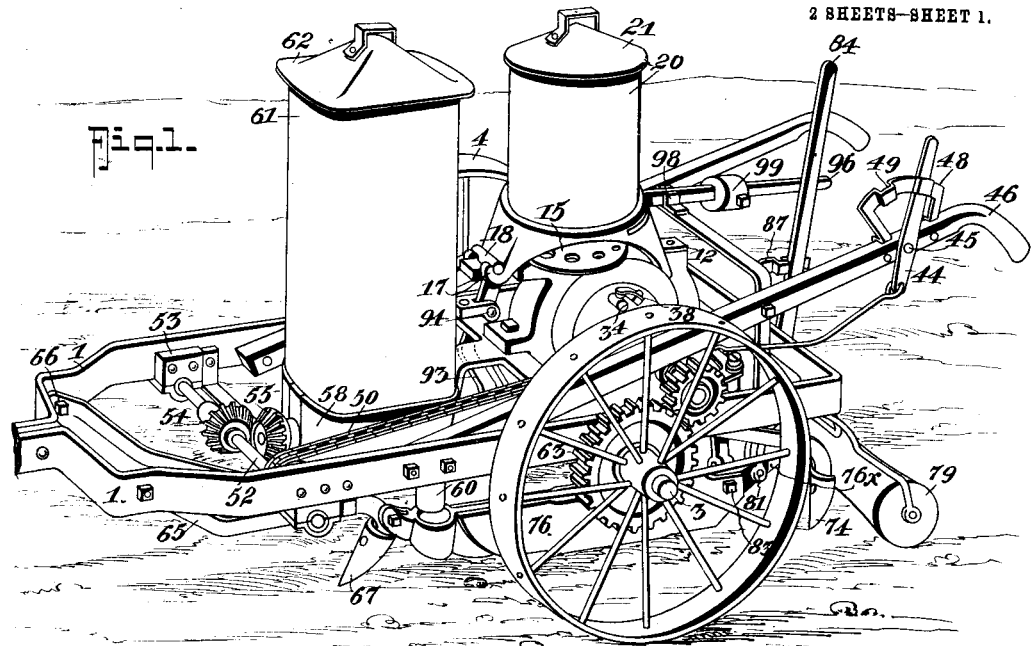
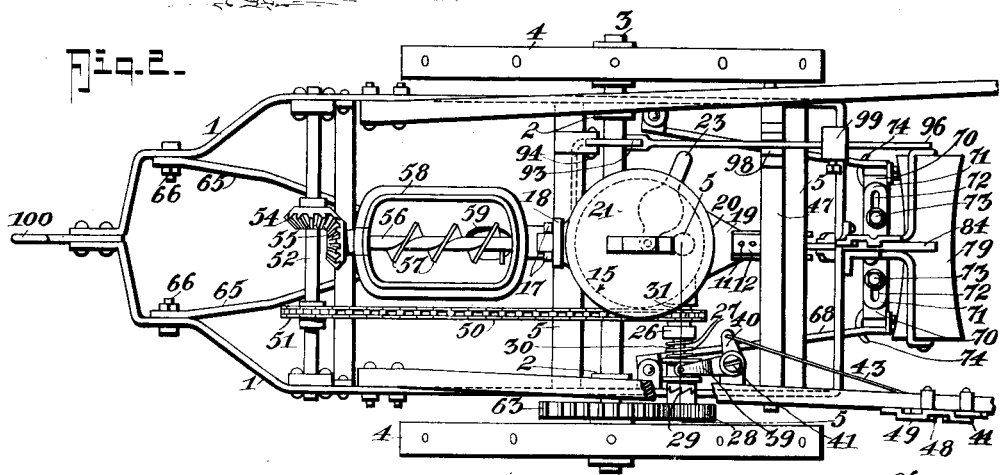
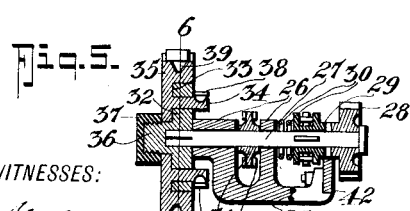
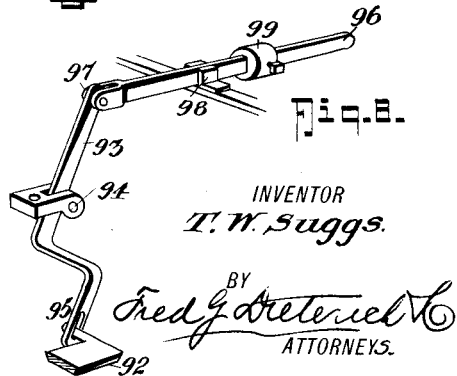
WITNESSES:
John T. Schrott
Charles J. Diller
INVENTOR
T. W. Suggs.
BY
Fred G. Dieterich
ATTORNEYS.

T. W. SUGGS.
PLANTER.
APPLICATION FILED APR. 14, 1913.
1,089,286.
Patented Mar. 3, 1914.
2 SHEETS—SHEET 1.
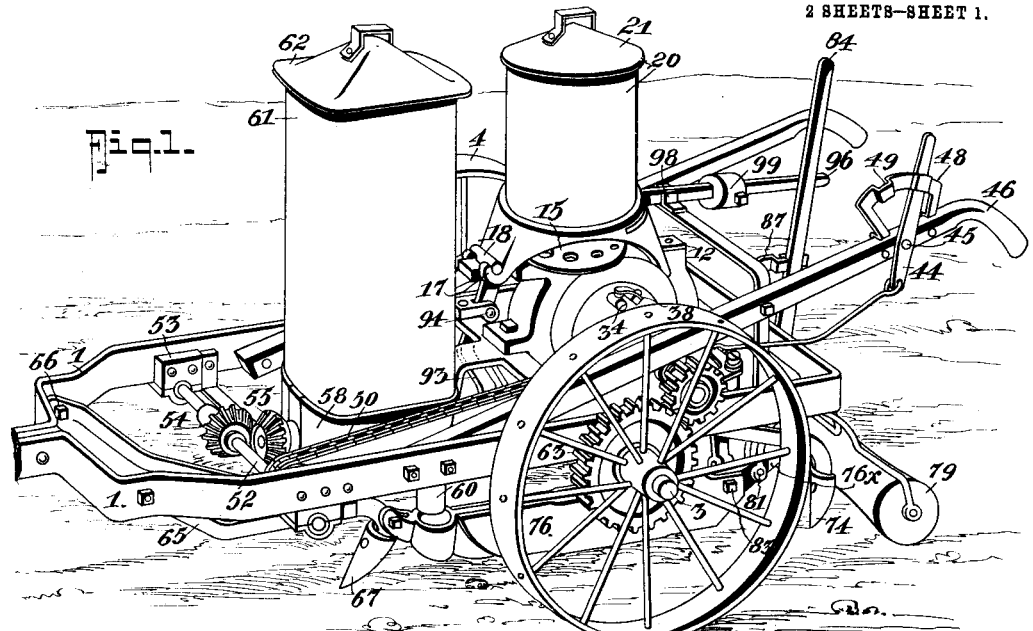
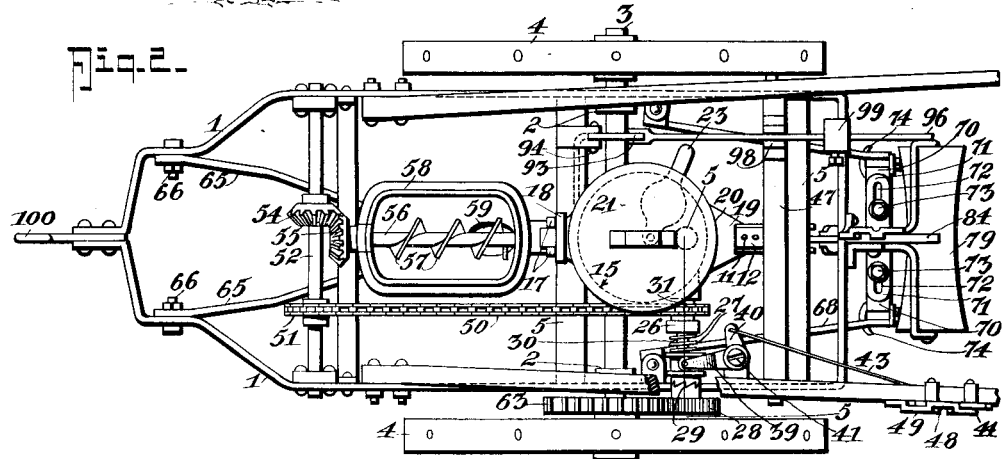
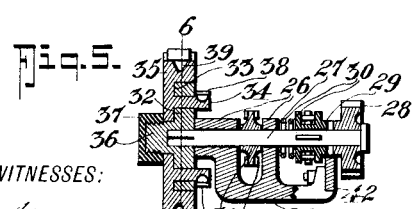
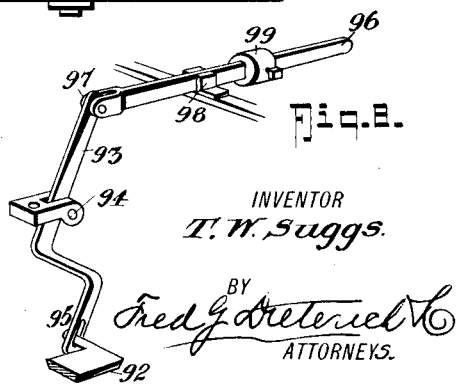
WITNESSES:
John T. Schrott
Charles J. Diller
INVENTOR
T. W. Suggs.
BY
Fred G. Dieterich
ATTORNEYS.
COLUMBIA PLANOGRAPH CO., WASHINGTON, D. C.

UNITED STATES PATENT OFFICE.

THEOPHILUS W. SUGGS, OF ARBA, NORTH CAROLINA.

PLANTER.

1,089,286. Specification of Letters Patent. Patented Mar. 3, 1914.

Original application filed September 23, 1912, Serial No. 721,844. Divided and this application filed April 14,.1913. Serial No. 760,923.

*To all whom it may concern:*

Be it known that I, THEOPHILUS W. SUGGS, residing at Arba, in the county of Greene and State of North Carolina, have invented certain new and useful Improvements in Planters, of which the following is a specification.

This invention, which is a divisional part of an invention disclosed in my co-pending application for improvements in planters, filed September 23, 1912, Serial No. 721844, is an improved planter for planting corn, peas, cotton, etc., and it primarily has for its object to provide a machine of this type in which means are provided for opening the furrow, dropping the seed in the regular fashion, covering the seed and leveling the ground after the seed has been planted.

The invention also includes a fertilizer feeding mechanism for fertilizing the ground after the machine passes over the same, the fertilizer mechanism and the seed dropping mechanism being adapted for simultaneous use or they may be separately employed, if desired.

Generically the invention provides, in one apparatus, a wheeled frame that supports the fertilizer and seed hoppers, and mechanism that allows the fertilizer and the seed to be properly fed to the ground, a furrow runner opener and coverer being mounted below the frame and adapted to be raised and lowered to clear it or enter the ground as desired. Devices for controlling the operation of the fertilizer feeding mechanism and of the seed dropping mechanism from a position conveniently accessible to the operator, are also provided.

The invention further includes a special construction of seed dropper feeding mechanism and a special adjustable furrow covering mechanism.

More subordinately the invention also includes those novel details of construction, combination and arrangement of parts, all of which will be first fully described and then be specifically pointed out in the appended claims, reference being had to the accompanying drawings, in which:—

Figure 1 is a perspective view of the complete apparatus. Fig. 2 is a top plan view of the same, the fertilizer hopper being removed. Fig. 3 is a side elevation of the apparatus. Fig. 4 is a central, vertical, longitudinal section of the same. Fig. 5 is a detail section on the line 5—5 of Fig. 2. Fig. 6 is a detail section on the line 6—6 of Fig. 5. Fig. 7 is a detail perspective view of the furrow closing plow support showing the manner of adjusting the position of plows. Fig. 8 is a detail perspective view of the fertilizer feeder gate and controlling lever therefor.

In the drawings in which like numerals designate like parts in all the figures, 1 represents the main frame of the machine, which carries the bearings 2, for the main shaft 3, on which the wheels 4 are mounted.

5 are cross bars on which the distributing wheel carrying frame 6 is mounted, the frame having lugs 7 through which it is bolted to the bars 5. The frame 6 has a bed 8 over which the hopper base 16, is mounted. The bed 8 has a throat 9, through which the seed is delivered to the distributing wheel or disk 35, the disk 35 having seed pockets 39 in its periphery. In order to hold the seed in the pockets 39 and to allow for unevenness in the size of the seed, a spring finger 12 is provided, that is mounted in the space 10 of the frame 6, and is secured at 11 to the bed of the frame 6. The frame 6 has a discharge throat 14 through which the end 13 of the spring 12, projects, and through which the seed is delivered into the chute 64.

Mounted on the bed 8 to turn on a pivot is a seed plate 15 which has a series of apertures of different sizes so that the device may be used with seed of different sizes, it being understood that the plate 15 is adjusted to bring an aperture of the proper size into position.

The hopper base 16 has lugs 17 that project under the cross bar 18 of the bed 8, and it also has fingers 19 to straddle the frame 6, whereby the hopper 20 may be swung back as indicated in dotted lines in Fig. 4 when it is desired to adjust the plate 15.

The hopper 20 is provided with the usual cover 21 and the base 16 has a slot 22 in which the cut off 23 operates, the cut off 23 being designed to open or close the discharge passage 24 from the hopper, see Fig. 4 of the drawings.

25 is a bearing yoke frame which carries the shaft 27 in the bearings 26. The shaft 27 carries a loose gear 28, that has a clutch face to coöperate with the clutch face of the shifting clutch element 29, the clutch element 29 being pressed by a spring 30 into its clutching position.

31 is a sprocket wheel on the shaft 27 for driving the fertilizer feeding mechanism hereinafter again referred to. The shaft 30 carries a fixed disk 32 which has a threaded hub 36 and receives the distributer disk or gear 35. The wheel 35 has lugs 34 that project through openings 33 in the disk 32 and are secured by latches 38 (see Figs. 1 and 5). The wheel 35 is further secured in place on the disk 32 by a threaded cap 37 (see Fig. 5). The shifting clutch member 29 is operated to move it out of its clutching position by a bell crank lever 39, which is pivoted at 41, and has its short arm 40 connected by a rod 43 to the operating lever 44 which is pivoted at 45 on one of the handles 46 and is adapted to be held in its "clutch in" and "clutch out" positions by an arc segment 48 which has recesses 49 to receive the lever 44, the same being of sufficient resiliency to be moved from one notch or recess 49 to the other.

50 is a sprocket chain that passes over the sprocket wheel 31 and over a second sprocket 51, on the counter shaft 52, which shaft is mounted in bearings 53 on the frame 1. The shaft 52 is geared through beveled pinions 54 and 55 with the worm shaft 56 that carries the screw or worm 57 within the hopper base 58, of the fertilizer hopper 61.

59 is the discharge port of the fertilizer base 58, and this port is controlled by a gate 92 to discharge the contents through the throat 91 and spout 60 into the ground. The hopper 61 may be provided with the usual top 62 if desired.

63 is the driving gear on the shaft 3 that meshes with the loose gear 28, on the shaft 27, and 64 is the discharge spout from the seed feeding part of the apparatus.

65 is the plow beam that is pivoted at 66 and carries the plow share 67, which opens the furrow. Toward the rear of the machine a second plow beam 68 is fulcrumed in the frame 1 and it is formed of two side members which are laterally adjustable at their ends so as to space the plows 74 closer or farther apart in a lateral direction as may be desired. This adjustment is obtained by the structure best shown in Fig. 7, by reference to which it will be seen that the rear extremities of the beam members 68 are bent downwardly at right angles and then back upon themselves to form U-shaped pendent members 69. Each U-shape member 69 has an inwardly and transversely projecting portion 70 that is adjustably secured to the connecting plate 71 by bolts 73 that pass through slots 72, in the plate 71, whereby the distance between the U-shape members 69 may be widened or narrowed as desired. The plow shares 74, are vertically adjustably secured in the U-shape members 69 by bolt devices 75.

76 is the separator or spreader which holds the furrow open until the fertilizer and seed has been dropped into the same. The separator or runner opener 76 is rigidly connected at 77 with the beam 65, and the separator 76 is secured at 83 to a rearwardly and upwardly projecting bar 76$^x$ that is in turn pivotally connected at 76$^y$ to a bracket 76$^z$ that is pendent from the underside of the bar or plate 71.

79 is the evener roller that has its carrier 80 pivoted at 81 and curved over the plate 71 so that when the separator 76 and the plows 67 and 74 are raised, as shown in Fig. 4, the roller 79 will also be raised off the ground.

The separator 76 is raised and lowered through the medium of a lever 84, which is pivoted at 85 to the frame 1 and coöperates with an arc segment 87 of a construction similar to the member 48 and having similar recesses for the reception of the lever 84. The lever 84 is connected at 86 to a link 82 that is in turn connected at 83 to the separator 76.

88 is a scraper or leveler that is removably secured at 90 to the plow beam 65, through the connection 89. The member 88 is used principally when planting cotton and may be detached at other times.

92 is the gate that controls the throat 91 of the fertilizer hopper base 58, through the medium of the mechanism best shown in Fig. 8 of the drawings, by reference to which it will be seen that the gate 92 has a finger 95 that operates in the slot of a lever 93, which is pivoted at 94 to a member fixed to one of the cross bars 5, the lever 93 connecting at 97 with a rod 96 which operates between stops 98 and has an adjustable collar 99 to regulate the position of the lever 93 and gate 92.

100 designates the draft hook to which the usual draft appliances and team may be attached.

From the foregoing description taken in connection with the accompanying drawings it is thought the complete construction operation and advantages of the invention will be apparent to those skilled in the art. It might be mentioned, however, that by the use of my apparatus any size seed may be used in the apparatus by simply adjusting the plate 15 to bring the proper size hole in register.

By my apparatus, fertilizer may be dropped at the same time the seeds are planted so that the ground may be fertilized and planted at one and the same operation if found desirable, or the gate 23 may be closed, and the gate 92 opened, whereupon fertilizer alone will be deposited from the machine. By closing the gate 92 and opening the cut off 23, seed alone will be planted by the machine.

What I claim is:

1. In a machine of the class stated, a wheeled draft frame, a furrow opening plow pivotally held and beneath said frame, a pivotally held furrow closing plow held by and below said frame, a runner opener rigidly secured to said opening plow and pivotally secured to said closing plow, and means for raising and lowering said plows and said runner opener together, and means for depositing material into the furrow when held open by said runner opener.

2. In a machine of the class stated, a wheeled draft frame, a furrow opening plow pivotally held by and beneath said frame, a pivotally held furrow closing plow held by and below said frame, a runner opener rigidly secured to said opening plow and pivotally secured to said closing plow, and means for raising and lowering said plows and said runner opener together, and means for depositing material into the furrow when held open by said runner opener, a ground scraper carried by said opener plow in advance of the plow share.

3. In a machine of the class stated, a wheeled draft frame, a furrow opening plow pivotally held by and beneath said frame, a pivotally held furrow closing plow held by and below said frame, a runner opener rigidly secured to said opening plow and pivotally secured to said closing plow, and means for raising and lowering said plows and said runner opener together, and means for depositing material into the furrow when held open by said runner opener, and a ground evener carried by said runner opener to the rear of the same.

4. In a machine of the character stated, a wheeled draft frame, a furrow opening plow including a plow beam and a plow share pivotally suspended by and beneath said draft frame, a furrow closing device including a divided plow beam and plow shares carried thereby, said divided plow beam being pivotally suspended by and beneath said draft frame, a runner opener connecting said first mentioned plow beam with said second mentioned plow beam, and a single lever operated device for raising and lowering said plows and said runner opener, and means carried by said draft frame for feeding material through said runner opener into the opened furrow.

5. In a machine of the character stated, a wheeled draft frame, a furrow opening plow including a plow beam and a plow share pivotally suspended by and beneath said draft frame, a furrow closing device including a divided plow beam and plow shares carried thereby, said divided plow beam being pivotally suspended by and beneath said draft frame, a runner opener connecting said first mentioned plow beam with said second mentioned plow beam, and a single lever operated device for raising and lowering said plows and said runner opener, and means carried by said draft frame for feeding material through said runner opener into the opened furrow, and a yieldably mounted furrow leveling roller carried by said runner opener and extending over and in back of said furrow closing plow, said furrow closing plow adapted to engage said roller when said plow is raised to raise said roller off the ground.

6. In a machine of the character stated, a wheeled draft frame, a furrow opening plow including a plow beam and a plow share pivotally suspended by and beneath said draft frame, a furrow closing device including a divided plow beam and plow shares carried thereby, said divided plow beam being pivotally suspended by and beneath said draft frame, a runner opener connecting said first mentioned plow beam with said second mentioned plow beam, and a single lever operated device for raising and lowering said plows and said runner opener, and means carried by said draft frame for feeding material through said runner opener into the opened furrow, and a yieldably mounted furrow leveling roller carried by said runner opener and extending over and in back of said furrow closing plow, said furrow closing plow adapted to engage said roller when said plow is raised to raise said roller off the ground, said furrow closing plow including a connection between said divided beam having provisions for lateral adjustment to space the plow shares a greater or less distance apart.

THEOPHILUS W. SUGGS.

Witnesses:
B. F. D. ALBRITTON,
GEO. D. ALLEN.

Copies of this patent may be obtained for five cents each, by addressing the "Commissioner of Patents, Washington, D. C."

Correction in Letters Patent No. 1,089,286.

It is hereby certified that Letters Patent No. 1,089,286, granted March 3, 1914, upon the application of Theophilus W. Suggs, of Arba, North Carolina, for an improvement in "Planters," was erroneously issued to the inventor, said Suggs, as sole owner of said invention, whereas said Letters Patent should have been issued to *the inventor and Walter D. Mewborn, of Jason, North Carolina*, said Mewborn being *assignee of one-half interest* in said invention as shown by the records of assignments in this office; and that the said Letters Patent should be read with this correction therein that the same may conform to the record of the case in the Patent Office.

Signed and sealed this 5th day of May, A. D., 1914.

[SEAL.]

J. T. NEWTON,
*Acting Commissioner of Patents.*